(12) United States Patent
Tait

(10) Patent No.: US 11,027,670 B1
(45) Date of Patent: Jun. 8, 2021

(54) SEAT-MOUNTED WIRELESS RECHARGEABLE TOOL HOLDER

(71) Applicant: FAURECIA AUTOMOTIVE SEATING, LLC, Auburn Hills, MI (US)

(72) Inventor: Shaun Dorian Tait, Troy, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 16/700,460

(22) Filed: Dec. 2, 2019

(51) Int. Cl.
| B60R 11/06 | (2006.01) |
| B60N 2/58 | (2006.01) |
| H02J 7/02 | (2016.01) |
| H02J 7/00 | (2006.01) |
| H02J 50/12 | (2016.01) |
| B60R 11/00 | (2006.01) |

(52) U.S. Cl.
CPC ........... *B60R 11/06* (2013.01); *B60N 2/58* (2013.01); *H02J 7/0047* (2013.01); *H02J 7/02* (2013.01); *H02J 50/12* (2016.02); *B60R 2011/0015* (2013.01); *B60R 2011/0045* (2013.01)

(58) Field of Classification Search
CPC . B60R 11/06; B60R 11/00; B60R 2011/0015; B60R 2011/0045; B60R 2011/0042; B60R 2011/0003; H02J 50/12; H02J 50/10; H02J 7/00047; H02J 7/02; B60N 2/58
USPC ................................................. 297/188.01
See application file for complete search history.

(56) References Cited

U.S. PATENT DOCUMENTS

| 3,670,936 | A | 6/1972 | Pronovost et al. |
| 4,936,531 | A | 6/1990 | Bauser |
| 7,073,923 | B2 | 7/2006 | Cope |
| 8,505,794 | B2 | 8/2013 | Ardigo |
| 10,583,787 | B1 * | 3/2020 | Toledo ................... B60N 2/90 |
| 2010/0282802 | A1 | 11/2010 | Carnevali |
| 2012/0132684 | A1 | 5/2012 | Ardigo |
| 2013/0119102 | A1 * | 5/2013 | Wisselmann ........... B60R 11/00 224/400 |
| 2014/0232500 | A1 * | 8/2014 | Alexander ............ H01F 7/0252 335/306 |

(Continued)

FOREIGN PATENT DOCUMENTS

| DE | 202018100119 U1 | 1/2018 |
| FR | 3001672 A1 | 8/2014 |
| FR | 3026902 A1 | 4/2016 |

*Primary Examiner* — Mark R Wendell
(74) *Attorney, Agent, or Firm* — Reising Ethington P.C.

(57) ABSTRACT

A rechargeable tool holder is provided for mounting a wirelessly rechargeable tool into a recessed portion of a vehicle seat. The vehicle seat includes a seat frame, a seat bottom, and a seat back. The seat includes a power supply connection providing electricity from a vehicle power source. The tool holder includes a recessed portion of the vehicle seat, a tool retention member such as a clip, and a wireless charger located adjacent to the trim piece to provide wireless charging of the tool when the tool is mounted at the retention member. The wireless charger has an input power connection from the vehicle power supply to recharge the tool while mounted. The rechargeable tool or piece of equipment may be a flashlight, a rotary-actuated or linearly-actuated power tool, or any other suitable wirelessly-charged tool or piece of equipment for which the holder is configured.

15 Claims, 3 Drawing Sheets

(56) References Cited

U.S. PATENT DOCUMENTS

| | | | |
|---|---|---|---|
| 2016/0249073 A1* | 8/2016 | Margis | B64D 11/00152 |
| 2018/0056887 A1* | 3/2018 | Salter | H02J 7/025 |
| 2018/0201196 A1 | 7/2018 | Hellman et al. | |
| 2019/0202365 A1* | 7/2019 | Medina Huerta | B60N 3/106 |
| 2020/0317103 A1* | 10/2020 | Kapolnek | B60R 11/0217 |

* cited by examiner

SEAT-MOUNTED WIRELESS RECHARGEABLE TOOL HOLDER

TECHNICAL FIELD

The present disclosure relates generally to vehicle seats and, in particular, to seat-mounted removable accessories such as wirelessly-rechargeable tools or equipment.

BACKGROUND

Vehicle passenger cabins commonly include several amenities for occupants of the vehicle. For example, some vehicles are equipped with accessories such as seat heaters, adjustable lighting, and cup holders to change the appearance or provide driver and passenger conveniences. Modern vehicle interiors commonly include more versatility in design and function. The vehicle seat is no exception.

U.S. patent application publication 2010/0282802 by Carnevali discloses a flashlight holder mounted on a console, for example, to receive a standard police-issued flashlight. A mouth of the flashlight holder provides a tubular receptacle to receive a flashlight vertically positioned therein. The flashlight holder may include clamping the holder to the vehicle console or connecting the holder using a threaded fastener within a face plate, for example by coupling a U-bolt into a socket portion of the vehicle console.

U.S. Pat. No. 7,073,923 by Cope discloses a combination vehicle charger and flashlight that provides illumination while a user connects a mobile device to the vehicle charger. The light source is electrically connected to a power supply to illuminate the area proximate the mobile device plug. The light may be used to illuminate the corresponding connector on the mobile device to facilitate connecting the mobile device to the vehicle charger in low-light environments. The power supply provides power for driving the light source and for charging the mobile device. A cord electrically connects the mobile device plug to the power plug.

U.S. Pat. No. 8,505,794 by Ardigo and assigned to Faurecia Interior Systems, Inc. discloses a versatile storage system which may include a storage pocket for a flashlight or other tool suspended from receiving elements in an interior door panel. The connecting elements may be attached to provide a flashlight or other tool in a vertical or horizontal orientation, based on the size and availability of space in a vehicle interior. The attachments are detachably connected to the receiving elements when in use and stowed away when not in use.

For at least many of the known approaches used by vehicle manufacturers to integrate electrical tool storage into a vehicle interior, it can be difficult to provide a convenient storage location that does not undesirably impact the functional and/or aesthetic features of the vehicle interior. Moreover, where power is needed or desired for accessory electrical devices, certain locations within the vehicle interior, such as in vehicle seats, have typically not been suitable since they have traditionally excluded an electrical power source.

SUMMARY

To overcome the above disadvantages in the prior art, it is a goal of the invention to provide a tool holder that stores and wirelessly charges one or more modern tools in a vehicle.

To achieve this goal, there is provided a rechargeable tool holder for mounting a wirelessly rechargeable tool into a recessed portion of a vehicle seat having a seat frame that attaches to a vehicle body and that supports a seat bottom and seat back. The seat includes a power supply connection providing electricity from a vehicle power source. The tool holder comprises:
(a) a trim piece configured to cover at least a part of the recessed portion of the vehicle seat, the trim piece including a decorative A-side surface and including an opposite B-side surface that faces inwardly towards the vehicle seat when the tool holder is mounted to the vehicle seat;
(b) a tool retention member, such as a clip, located adjacent the trim piece at the A-side of the trim piece configured to be at least partially located in the recessed portion of the vehicle seat when the tool holder is mounted to the vehicle seat, the tool retention member defining a tool space sized to receive the rechargeable tool and positively support and retain the rechargeable tool at least partially within the recessed portion of the vehicle seat; and
(c) a wireless charger located adjacent the trim piece configured to provide inductively-coupled charging power to the rechargeable tool when the rechargeable tool is attached to the tool retention member, the wireless charger having an input power connection configured to electrically connect to the power supply connection of the vehicle seat configured to receive operating power used to provide the charging power to the rechargeable tool.

In various embodiments, the rechargeable tool is a flashlight.

In various embodiments, the rechargeable tool is a power tool capable of rotary or linear actuation.

In various embodiments, the wireless charger is a resonant charger, an inductive charger, or a combination thereof.

In various embodiments, the tool retention member comprises one or more clips.

In various embodiments, the wireless charger is located at the B-side of the trim piece.

In various embodiments, the tool retention member comprises a magnet positioned relative to the tool space configured to retain the rechargeable tool in place using magnetic attraction between the magnet and rechargeable tool.

In various embodiments, the assembly further comprises a charging light indicator located at or in the trim piece.

In various embodiments, the recessed portion of the vehicle seat is located in a side surface of the seat that has a generally continuous conformation that runs along a length of the side surface and that is interrupted by the recessed portion such that the recessed portion extends into the vehicle seat from the side surface, whereby the tool holder is at least partially recessed within the vehicle seat when the tool holder is mounted into the recessed portion of the vehicle seat, and wherein the rechargeable tool, when mounted in the tool holder, is also at least partially recessed within the vehicle seat by being positioned at least partially within the generally continuous side surface of the vehicle seat.

In various embodiments, the tool retention member is configured to retain the rechargeable tool in an orientation such that the rechargeable tool extends in a direction generally parallel to the generally continuous conformation of the side surface of the vehicle seat with the tool holder is mounted in the recessed portion of the vehicle seat.

In accordance with various embodiments, the tool space defined by the tool retention member is configured to hold the rechargeable tool by an interference fit between the tool retention member and a handle of the rechargeable tool.

In accordance with another aspect of the invention, there is provided a vehicle seat that comprises: a seat frame that attaches to a vehicle body; a seat bottom supported by the seat frame; a seat back extending upwardly from the seat back and supported by the seat frame; wherein the seat bottom and seat back include a cushioned outer covering, with at least one of the seat bottom and the seat back having a recessed portion extending into the vehicle seat; a power supply connection providing electricity from a vehicle power source; and a rechargeable tool holder mounted in the recessed portion of the vehicle seat, the tool holder comprising:

(a) a trim piece covering at least a part of the recessed portion of the vehicle seat, the trim piece including a decorative A-side surface and including an opposite B-side surface that faces inwardly towards the vehicle seat;

(b) a tool retention member located adjacent the trim piece at the A-side of the trim piece and at least partially located in the recessed portion of the vehicle seat, the tool retention member defining a tool space sized to receive a rechargeable tool and positively support and retain the rechargeable tool at least partially within the recessed portion of the vehicle seat; and (c) a wireless charger located adjacent the trim piece configured to provide inductively-coupled charging power to the rechargeable tool when the rechargeable tool is attached to the tool retention member, the wireless charger having an input power connection electrically connected to the power supply connection of the vehicle seat configured to receive operating power used to provide the charging power to the rechargeable tool.

In various embodiments, the vehicle seat comprises a support member that is supported by a portion of the seat frame, wherein the trim piece is attached to the support member.

In various embodiments, the recessed portion of the vehicle seat is located in a side surface of the seat bottom or seat back that has a generally continuous conformation that runs along a length of the side surface and that is interrupted by the recessed portion such that the recessed portion extends into the vehicle seat from the side surface, whereby the tool holder is at least partially recessed within the vehicle seat, and wherein the rechargeable tool, when mounted in the tool holder, is also at least partially recessed within the vehicle seat by being positioned at least partially within the generally continuous side surface of the vehicle seat.

In various embodiments, the vehicle seat includes a rechargeable tool mounted in the tool holder.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments of the present invention will become better understood with reference to the following description, appended claims, and accompanying drawings, in which like designations in the drawings denote like elements, and wherein:

DETAILED DESCRIPTION OF EMBODIMENTS

Figure 1:
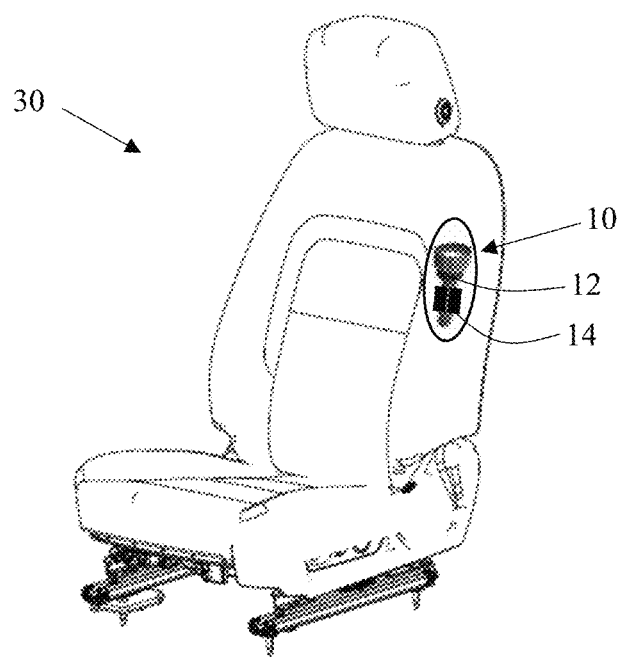
FIG. 1 is a perspective view of a first embodiment of a vehicle seat including a seat frame, seat bottom, and a seat back, including a location of the rechargeable tool holder attached at a side of the seat back.
Figure 2:
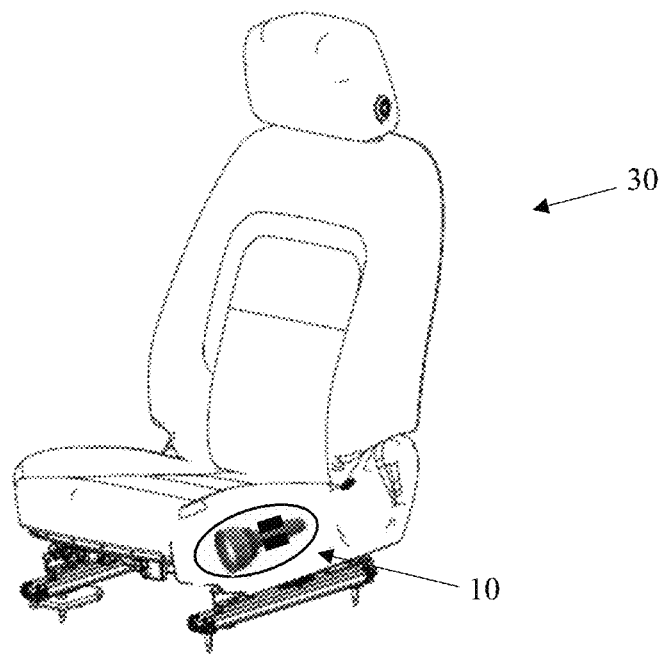
FIG. 2 is a perspective view of a second embodiment of a vehicle seat including a seat frame, seat bottom, and a seat back, including a location of the rechargeable tool holder attached at a side of the seat bottom.
Figure 3:
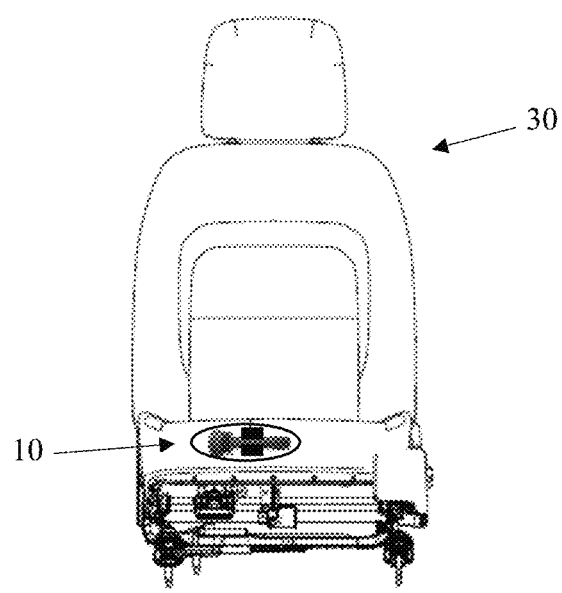
FIG. 3 is a perspective view of a third embodiment of a vehicle seat including a seat frame, seat bottom, and a seat back, including a location of the rechargeable tool holder attached at a front of the seat bottom.
Figure 4:
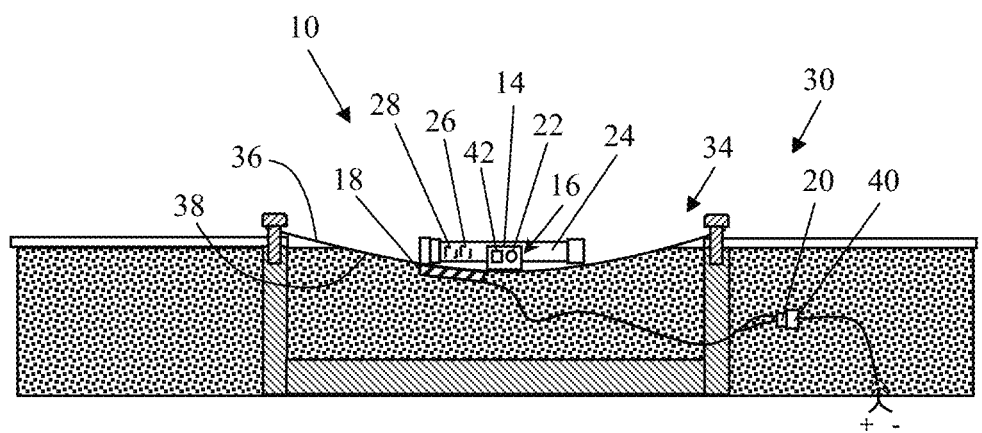
FIG. 4 is a cross-sectional view of the rechargeable tool holder of FIG. 1 showing the rechargeable tool orientation with respect to the plane of the seat surface with relative position of the tool holder recessed into the seat.

The present disclosure is directed to a rechargeable tool holder 10, to a rechargeable tool 12 that may be stored in the tool holder 10, and to a vehicle seat 30 that includes the tool holder 10 and tool 12 located in a recessed portion of the seat. With reference generally to FIGS. 1-3, the tool holder 10 may be integrated into the seat 30 at any of a number of locations. Referring also to FIG. 4, the tool holder 10 includes a trim piece 32, a tool retention member 14 having a tool space 16 for receiving the tool 12, and a wireless charger 18. The trim piece 32 is configured to cover at least a part of the recessed portion 34 of the vehicle seat 30, with the trim piece 32 including a decorative A-side surface 36 and an opposite B-side surface 38 that faces inwardly towards a middle section of the vehicle seat 30 when the tool holder 10 is mounted to the vehicle seat 30.

The tool retention member 14 is located adjacent the trim piece 32 at the A-side surface 36 of the trim piece 32 and configured to be at least partially located in the recessed portion 34 of the vehicle seat 30 when the tool holder 10 is mounted to the vehicle seat 30. The tool retention member 14 defines the tool space 16 that is sized to receive the rechargeable tool 12 and positively supports and retains the rechargeable tool 12 at least partially within the recessed portion 34 of the vehicle seat 30. In the example shown, the tool retention member 14 is a resilient plastic clip that extends partially around a portion of the tool to positively retain it in place in the holder 10. For a tool 12 having a circular cross section, such as the flashlight shown in the figures, the clip may be constructed such that the tool receiving space 16 defined by the clip is the same as, or slightly smaller than, the cross section of the tool 12, with the clip being in the form of an open band of appropriate axial width that extends circumferentially about the tool 12 by a distance that is greater than 180°, but less than 270° so that the tool may be snapped into the clip and removably held in the tool receiving space 16 by a pressure fit between the clip and tool 12. The trim piece 32 and tool retention member 14 may be formed as separate components that are removably or permanently integrated together, or may be formed as a single unitary component by a single injection molding process, or may be formed in another manner. Suitable techniques and materials for forming the trim piece 32 and tool retention member will be known to those skilled in the art.

A wireless charger 18 is located adjacent the trim piece 32 and configured to provide inductively-coupled charging power to the rechargeable tool 12 when the rechargeable tool 12 is attached to the tool retention member 14. For this purpose, the tool 12 includes a charging circuit 26 that includes a power pickup coil configured to receive inductively-coupled power from the wireless charger 18 and to provide electrical charge to a lithium ion or other battery 28 within the tool 12. The wireless charger 18 has an input power connection 20 configured to electrically connect to the power supply connection 40 of the vehicle seat 30 and is configured to receive operating power to provide the charging power to the rechargeable tool 12.

In various embodiments, the rechargeable tool 12 may be any handheld rechargeable device suitable for mounting to the seat 30. For example, it may be a conventional or other flashlight, as shown. Alternatively, the rechargeable tool 12 may be a conventional or other power tool 12 capable of rotary or linear actuation.

The rechargeable tool holder 10 may include the wireless charger 18 as a resonant charger, an inductive charger, or a combination thereof. Various circuit designs for providing resonant wireless charging and more traditional inductive charging are known to those skilled in the art.

The rechargeable tool holder 10 includes the tool retention member 14 that may include one or more clips. Although the tool retention member 14 is illustrated as a clip, it may be any form of attachment from the tool holder 10 to the rechargeable tool 12. The tool retention member 14, by way of non-limiting examples, may include a suitable fastener, flexible material, spring, magnet, or other mechanism to hold or otherwise secure the rechargeable tool 12. The tool retention member 14 may include, for example, a magnet 42 positioned relative to the tool space 16 and configured to retain the rechargeable tool 12 in place using magnetic attraction between the magnet 42 and a ferromagnetic element or casing of the rechargeable tool 12. This magnet 42 may be used in addition to or in lieu of the snap fit retention of the tool 12 into the tool retention member 14. For example, the snap fit of the tool 12 into the clip (tool retention member 14) may be used to provide the primary means of retention of the tool 12 in the holder 10, whereas the magnet 42 may be used to locate the tool 12 in the holder 10 axially along its central axis (centerline) so as to provide proper alignment of the tool's charging circuit 26 with the wireless charger 18 for efficient power transfer.

The rechargeable tool holder 10 includes the wireless charger 18 located at the B-side surface 38 of the trim piece 32.

The rechargeable tool holder 10 may further include a charging light indicator 22 located at or in the trim piece 32.

The rechargeable tool holder 10 fits within the recessed portion 34 of the vehicle seat 30 located in a side surface of the seat 30 that has a generally continuous conformation that runs along a length of the side surface and that is interrupted by the recessed portion 34 such that the recessed portion 34 extends into the vehicle seat 30 from the side surface. The tool holder 10 is at least partially recessed within the vehicle seat 30 when the tool holder 10 is mounted into the recessed portion 34 of the vehicle seat 30. When the rechargeable tool 10 is mounted in the tool holder 10, it is also at least partially recessed within the vehicle seat 30 by being positioned at least partially underneath the generally continuous side surface of the vehicle seat 30.

The rechargeable tool holder 10 may be implemented so that the tool retention member 14 is configured to retain the rechargeable tool 12 in an orientation such that the rechargeable tool 12 extends in a direction generally parallel to the generally continuous conformation of the side surface of the vehicle seat 30 with the tool holder 10 is mounted in the recessed portion 34 of the vehicle seat 30.

The rechargeable tool holder 10 defines the tool space 16 adjacent the tool retention member 14. As noted above, the tool retention member 14 may be configured to hold the rechargeable tool 12 by an interference fit between the tool retention member 14 and a handle 24 of the rechargeable tool 12.

Figure 5:
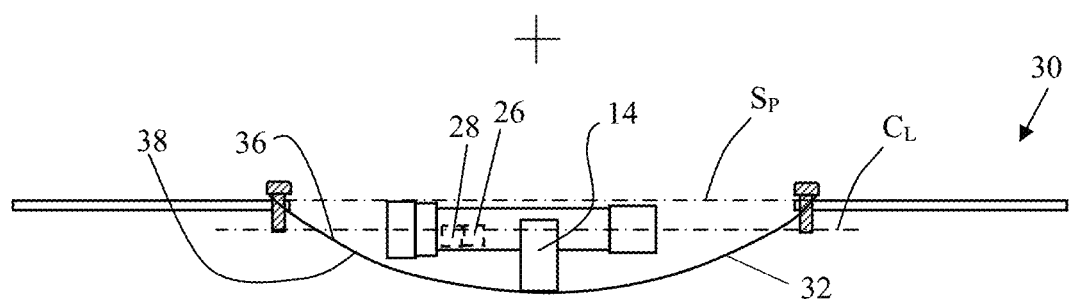
FIG. 5 is a cross-sectional view of another embodiment of the rechargeable tool holder illustrating a center point of the recessed surface on the seat, the centerline of the rechargeable tool while in the rechargeable tool holder, and the outer surface of the seat cover such that the centerline of the tool is offset from the plane of the seat surface at a location below the plane of the seat surface.

Referring to FIG. 5, the position of the tool 12 within the recessed portion 34 can be selected as desired or needed for a particular application. For example, the tool holder 10 may be positioned within the recessed portion 34 such that at least a part of the tool 12 is located below the surface plane $S_P$ of the seat. In some embodiments, like the one shown in FIG. 5, the tool 12 may be located within the recessed portion 34 such that a centerline $C_L$ of the tool is located beneath the surface plane $S_P$ of the seat. This has the advantage that the tool is substantially located within the seat so as to not be accidentally contacted or dislodged from its mounting in tool holder 10. In some embodiments, the position of the tool holder 10 within the recessed portion may be such that the entire tool 12 is below the surface plane $S_P$ of the seat when the tool 12 is held in the tool retention member 14. In other embodiments, the positioning of the tool holder 10 in the recessed portion may be such that the centerline $C_L$ of the tool is located beneath the surface plane $S_P$ of the seat with a minor portion (<50%) of the tool 12 extending above the surface plane $S_P$ of the seat.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A rechargeable tool holder for mounting a wirelessly rechargeable tool into a recessed portion of a vehicle seat having a seat frame that attaches to a vehicle body and that supports a seat bottom and seat back, wherein the recessed portion of the vehicle seat is located in a side surface of the seat, the seat including a power supply connection providing electricity from a vehicle power source, the tool holder comprising:

a trim piece configured to cover at least a part of the recessed portion of the vehicle seat, the trim piece including a decorative A-side surface and including an opposite B-side surface that faces inwardly towards the vehicle seat when the tool holder is mounted to the vehicle seat;

a tool retention member located adjacent the trim piece at the A-side of the trim piece and configured to be at least partially located in the recessed portion of the vehicle seat when the tool holder is mounted to the vehicle seat, the tool retention member defining a tool space sized to receive the rechargeable tool and positively support and retain the rechargeable tool at least partially within the recessed portion of the vehicle seat; and a wireless charger located adjacent the trim piece and configured to provide inductively-coupled charging power to the rechargeable tool when the rechargeable tool is attached to the tool retention member, the wireless charger having an input power connection configured to electrically connect to the power supply connection of the vehicle seat and configured to receive operating power used to provide the charging power to the rechargeable tool.

2. The rechargeable tool holder set forth in claim 1, wherein the wireless charger is a resonant charger, an inductive charger, or a combination thereof.

3. The rechargeable tool holder set forth in claim 1, wherein the tool retention member comprises one or more clips.

4. The rechargeable tool holder set forth in claim 1, wherein the wireless charger is located at the B-side of the trim piece.

5. The rechargeable tool holder set forth in claim 1, wherein the tool retention member comprises a magnet positioned relative to the tool space configured to retain the rechargeable tool in place using magnetic attraction between the magnet and rechargeable tool.

6. The rechargeable tool holder set forth in claim 1, further comprising a charging light indicator located at or in the trim piece.

7. The rechargeable tool holder set forth in claim 1, wherein the side surface of the seat has a generally continuous conformation that runs along a length of the side surface and that is interrupted by the recessed portion such that the recessed portion extends into the vehicle seat from the side surface, whereby the tool holder is at least partially recessed within the vehicle seat when the tool holder is mounted into the recessed portion of the vehicle seat, and wherein the rechargeable tool, when mounted in the tool holder, is also at least partially recessed within the vehicle seat by being positioned at least partially within the generally continuous side surface of the vehicle seat.

8. The rechargeable tool holder set forth in claim 7, wherein the tool retention member is configured to retain the rechargeable tool in an orientation such that the rechargeable tool extends in a direction generally parallel to the generally continuous conformation of the side surface of the vehicle seat with the tool holder is mounted in the recessed portion of the vehicle seat.

9. The rechargeable tool holder set forth in claim 1, wherein the tool space defined by the tool retention member is configured to hold the rechargeable tool by an interference fit between the tool retention member and a handle of the rechargeable tool.

10. A rechargeable tool holder for mounting a wirelessly rechargeable tool into a recessed portion of a vehicle seat having a seat frame that attaches to a vehicle body and that supports a seat bottom and seat back, the seat including a power supply connection providing electricity from a vehicle power source, the tool holder comprising:

a trim piece configured to cover at least a part of the recessed portion of the vehicle seat, the trim piece including a decorative A-side surface and including an opposite B-side surface that faces inwardly towards the vehicle seat when the tool holder is mounted to the vehicle seat;

a tool retention member located adjacent the trim piece at the A-side of the trim piece and configured to be at least partially located in the recessed portion of the vehicle seat when the tool holder is mounted to the vehicle seat, the tool retention member defining a tool space sized to receive the rechargeable tool and positively support and retain the rechargeable tool at least partially within the recessed portion of the vehicle seat; and a wireless charger located adjacent the trim piece and configured to provide inductively-coupled charging power to the rechargeable tool when the rechargeable tool is attached to the tool retention member, the wireless charger having an input power connection configured to electrically connect to the power supply connection of the vehicle seat and configured to receive operating power used to provide the charging power to the rechargeable tool, wherein the rechargeable tool is a flashlight or a power tool capable of rotary or linear actuation.

11. The rechargeable tool holder set forth in claim 10, further comprising the rechargeable tool.

12. A vehicle seat, comprising:

a seat frame that attaches to a vehicle body;

a seat bottom supported by the seat frame;

a seat back extending upwardly from the seat back and supported by the seat frame;

wherein the seat bottom and seat back include a cushioned outer covering, with at least one of the seat bottom and the seat back having a recessed portion extending into the vehicle seat;

a power supply connection providing electricity from a vehicle power source; and a rechargeable tool holder mounted in the recessed portion of the vehicle seat, the tool holder comprising:

a trim piece covering at least a part of the recessed portion of the vehicle seat, the trim piece including a decorative A-side surface and including an opposite B-side surface that faces inwardly towards the vehicle seat;

a tool retention member located adjacent the trim piece at the A-side of the trim piece and at least partially located in the recessed portion of the vehicle seat, the tool retention member defining a tool space sized to receive a rechargeable tool and positively support and retain the rechargeable tool at least partially within the recessed portion of the vehicle seat; and a wireless charger located adjacent the trim piece and configured to provide inductively-coupled charging power to the rechargeable tool when the rechargeable tool is attached to the tool retention member, the wireless charger having an input power connection electrically connected to the power supply connection of the vehicle seat and configured to receive operating power used to provide the charging power to the rechargeable tool;

wherein the recessed portion of the vehicle seat is located in a side surface of the seat bottom or seat back that has a generally continuous conformation that runs along a length of the side surface and that is interrupted by the recessed portion such that the recessed portion extends into the vehicle seat beneath a surface plane of the side surface of the seat, whereby the tool holder is at least partially recessed within the vehicle seat, and wherein the rechargeable tool, when mounted in the tool holder, is also at least partially recessed within the vehicle seat by being positioned at least partially within the generally continuous side surface of the vehicle seat such that a centerline of the tool is located beneath the surface plane of the seat.

13. The vehicle seat set forth in claim 12, further comprising a support member that is supported by a portion of the seat frame, wherein the trim piece is attached to the support member.

14. The vehicle seat set forth in claim 12, wherein the rechargeable tool, when mounted in the tool holder, is recessed within the vehicle seat by being entirely located below the surface plane of the side surface of the vehicle seat.

15. The seat set forth in claim 12, further comprising the rechargeable tool mounted in the tool holder.

\* \* \* \* \*